United States Patent

Nakao

[11] Patent Number: 5,443,887
[45] Date of Patent: Aug. 22, 1995

[54] ASBESTOS-FREE COMPOSITION FOR GASKETS CONTAINING AN OIL ABSORBENT AGENT AND GASKETS INCLUDING THE COMPOSITION

[75] Inventor: Sadao Nakao, Yamato, Japan

[73] Assignee: Nippon Reinz Co., Ltd., Kanagawa, Japan

[21] Appl. No.: 247,489

[22] Filed: May 23, 1994

Related U.S. Application Data

[63] Continuation of Ser. No. 881,762, May 12, 1992, abandoned.

[30] Foreign Application Priority Data

| | | | |
|---|---|---|---|
| May 15, 1991 | [JP] | Japan | 3-139645 |
| May 15, 1991 | [JP] | Japan | 3-139646 |
| Sep. 11, 1991 | [JP] | Japan | 3-261061 |

[51] Int. Cl.⁶ .................... F16J 15/00; C09K 3/10
[52] U.S. Cl. .................... 428/137; 428/327; 428/133; 428/492; 428/465; 428/292; 524/81; 524/423; 277/235 B; 277/DIG. 6
[58] Field of Search ............ 428/327, 133, 137, 492, 428/465, 292; 524/81, 423; 277/235 B, DIG. 6

[56] References Cited

U.S. PATENT DOCUMENTS

| | | | |
|---|---|---|---|
| 3,878,175 | 4/1975 | Steckler | 521/63 |
| 3,919,448 | 11/1975 | Dufresne | 277/DIG. 6 |
| 4,546,033 | 10/1985 | Tsuchimoto et al. | 428/290 |
| 4,560,718 | 12/1985 | Ritchey | 524/13 |
| 4,728,111 | 3/1988 | Yoshijimu et al. | 277/235 B |

FOREIGN PATENT DOCUMENTS

| | | |
|---|---|---|
| 0326926 | 8/1989 | European Pat. Off. |
| 0441512A2 | 8/1991 | European Pat. Off. |
| 4001867 | 7/1990 | Germany |
| 62-164784 | 7/1987 | Japan |
| 2138855 | 10/1984 | United Kingdom |

OTHER PUBLICATIONS

Database WPIL, Week 8801, Derwent Publications Ltd., London, GB; AN 88-003558 & JP-A-62 267 394 (Furukawa) 20 Nov. 1987 (abstract).
Database WPIL, Week 8514, Derwent Publication Ltd., London, GB; AN 85-08312 & JP-A-60 032 881 (Nippon Reinz) 20 Feb. 1985 (abstract).
Database WPIL, Week 8919, Derwent Publications Ltd., London, GB; AN 89-140869 & JP-A-1-085 274 (Oribest) 30 Mar. 1989 (abstract).
Database WPIL, Week, 8946, Derwent Publications Ltd., London, GB; AN 89-335943 & JP-A-1 249 825 (Toshiba Chem) (abstract).
European Search Report dated Jul. 7, 1993.

Primary Examiner—William P. Watkins, III
Attorney, Agent, or Firm—Armstrong, Westerman, Hattori, McLeland & Naughton

[57] ABSTRACT

An asbestos-free gasketing composition comprising (a) a rubber component, (b) a non-asbestos fiber, (c) an oil-absorbing agent and (d) a filler useful for forming gasketing profiles such as a joint sheet, a beater sheet, a sheet containing a perforated metal core plate and the like. A gasket obtained therefrom which contains the composition has excellent oil sealing properties while exhibiting satisfactory strength.

6 Claims, 1 Drawing Sheet

ASBESTOS-FREE COMPOSITION FOR GASKETS CONTAINING AN OIL ABSORBENT AGENT AND GASKETS INCLUDING THE COMPOSITION

This application is a continuation of application Ser. No. 07/881,762 filed May 12, 1992, now abandoned.

FIELD OF THE INVENTION

This invention relates to an asbestos-free composition with excellent oil sealing properties which is useful as a material of gaskets for sealing of automobile parts and industrial machinery. More particularly, it relates to an asbestos-free composition for forming gasketing profiles, such as a joint sheet, a beater sheet, a sheet containing a perforated metal core plate, etc. and to various gaskets obtained therefrom.

BACKGROUND OF THE INVENTION

Harmfulness of asbestos fiber has recently been pointed out, and asbestos-free gasketing profiles for use in, for example, joints of a converter housing and a transmission case of automobiles have been demanded. Gaskets for such uses are required to be thin, to exhibit excellent sealing properties, particularly oil sealing properties, with a low clamp pressure, and to have sufficient strength, particularly tensile strength, for withstanding repeated applications of a load such as a shear force.

With the latest marked advancement of techniques, there is an increasing demand for gaskets with sufficiently high performance for use under conditions getting more severe. However, it has been difficult to satisfy the above-described requirements, particularly strength requirements, without using asbestos fiber. For example, JP-A-62-164784 (the term "JP-A" as used herein means an "unexamined published Japanese patent application") discloses an asbestos-free composition for a joint sheet, but it turned out that the composition does not always meet the requirement of oil sealing properties with a low clamp pressure. Not arising when asbestos fiber is employed, this problem is inherent in the use of non-asbestos fibers.

On the other hand, various beater sheets using non-asbestos fibers have been proposed. Since non-asbestos fibers are generally less compatible with other compounding additives, such as rubbers, than asbestos fiber, beater sheets using them are not always satisfactory in oil sealing properties at a low clamp pressure. This problem has become acute with the recent tendency that the conditions of use of beater sheets are getting more severe.

SUMMARY OF THE INVENTION

An object of the present invention is to provide a non-asbestos composition for gasketing profiles for various gaskets, such as a joint sheet, a beater sheet, and a gasket containing a perforated metal core plate.

Another object of the present invention is to provide an asbestos-free beater sheet having improved oil sealing properties, and a gasket obtained therefrom.

A further object of the present invention is to provide an asbestos-free joint sheet having improved oil sealing properties, and a gasket obtained therefrom.

A still further object of the present invention is to provide an asbestos-free gasket containing therein a perforated metal core plate and having improved oil sealing properties.

The above objects of the present invention are accomplished by a composition comprising (a) a rubber component, (b) a non-asbestos fiber, (c) an oil-absorbent agent, and (d) a filler and a gasketing profile comprising the same.

BRIEF DESCRIPTION OF THE ACCOMPANYING DRAWINGS

DETAILED DESCRIPTION OF THE INVENTION

Figure 1:
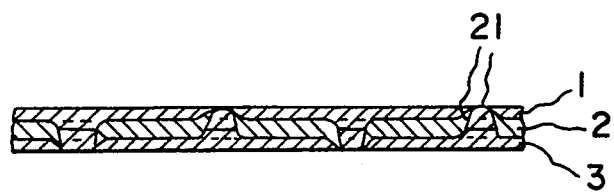
FIG. 1 is a cross section of a gasketing profile for a gasket, comprising a perforated metal core plate having provided on both sides thereof a seal layer comprising the composition of the present invention.

The rubber component which can be used in the present invention includes natural rubber, a styrene-butadiene rubber (hereinafter abbreviated as SBR), an acrylonitrile-butadiene rubber (hereinafter abbreviated as NBR), an acrylic rubber, a silicone rubber, and a fluoroelastomer. Of these, natural rubber, SBR, and NBR are preferably used due to their good compatibility with a non-asbestos fiber and a filler. Compositions using a rubber component in the form of a latex are particularly useful for production of a beater sheet.

The non-asbestos fiber which can be used in the present invention includes organic fibers, inorganic fibers except asbestos fiber, and mixtures thereof. Of these, cellulose fiber and high-temperature resistant artificial fibers are preferred. Examples of the organic synthetic fibers include high polymer fibers, e.g., aromatic polyamide fiber, phenolic resin fiber, fluorocarbon fiber, aromatic polyester fiber, aromatic polyimide fiber, aromatic polybenzimidazole fiber, and carbon fiber. High-temperature resistant organic synthetic fibers, e.g., aromatic polyamide fibers and phenolic resin fibers, are more preferred. Cellulose fiber is particularly preferred for the beater sheet. Examples of the inorganic synthetic fibers are silica fiber, zirconia fiber, rock wool, alumina fiber, alumina-silica fiber, phosphate fiber, potassium titanate fiber, glass fiber, and metal fiber.

The non-asbestos fibers to be used have a diameter preferably of not more than 50 $\mu$m, and more preferably of from 1 to 20 $\mu$m; a length of from 0.5 to 200 mm, and more preferably of from 1 to 50 mm. When the non-asbestos fibers are used for a sheet containing a perforated metal core plate, they have a diameter preferably of not more than 50 $\mu$m, and more preferably of from 1 to 30 $\mu$m with an aspect ratio of from 5 to 1000, and particularly from 20 to 700. In particular, organic fibers preferably have a diameter of not more than 40 $\mu$m, and particularly from 1 to 20 $\mu$m, with an aspect ratio of from 5 to 700, and particularly from 25 to 500.

The non-asbestos fibers are used in an amount of from 50 to 500 parts by weight, and preferably from 100 to 300 parts by weight, per 100 parts by weight of the rubber component on a solid basis. If the amount of the non-asbestos fibers are less than 50 parts, the composition is poor in mechanical characteristics, such as tensile strength. If it exceeds 500 parts, the composition has deteriorated processability into sheet.

The oil-absorbent agent which can be used in the present invention is a substance having saturation oil absorption to the oil described below at room temperature (20° C.) of at least three times, preferably at least five times, more preferably at least eight times the weight of the substance itself and capable of swelling by the oil absorption. The "oil" as used herein refers to aliphatic, aromatic and alicyclic mineral oils and the mixture thereof, and specifically refers to petroleum ether, benzine, ligroin, gasoline, naphtha, kerosine, gas oil, and fuel oil, and transformer oil, spindle oil, machine oil, and process oil made of the mineral oils and the mixture thereof.

Examples of suitable oil-absorbent agent are polynorbornene rubber-based oil-absorbent agent and the self-swelling acrylic polymers obtained by polymerizing a monomer component comprising 90 to 99.999% by weight of (A) a monomer having as a main moiety thereof a (meth)acrylate of a monovalent aliphatic alcohol of 10 to 16 carbon atoms and possessing one polymerizable unsaturated group in the molecular unit thereof and 0.001 to 10% by weight of (B) a cross-linkable monomer possessing at least two polymerizable unsaturated groups in the molecular unit thereof (providing that the total of the amounts of the monomers (A) and (B) is 100% by weight).

The (meth)acrylate which constitutes itself the main moiety of the monomer (A) of this invention possessing one polymerizable unsaturated group in the molecular unit thereof is a (meth)acrylate of a monovalent aliphatic alcohol of 10 to 16 carbon atoms represented by the general formula,

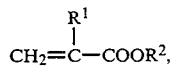

$$CH_2 = \overset{R^1}{\underset{|}{C}} - COOR^2,$$

wherein $R^1$ is a hydrogen atom or methyl group and $R^2$ is an aliphatic hydrocarbon group of 10 to 16 carbon atoms. The number of carbon atoms of the aliphatic hydrocarbon group in the (meth)acrylate must be in the range of 10 to 16. If the number of carbon atoms is less than 10, the produced cross-linked polymer possesses no sufficient ability to absorb oil. If the (meth)acrylate to be used is such that the number of carbon atoms in the aliphatic hydrocarbon group thereof exceeds 16, since the crystallinity between the side chains is high, the produced cross-linked polymer exhibits a conspicuously low oil-absorbing property at normal room temperature.

The (meth)acrylates of monovalent aliphatic alcohols having 10 to 16 carbon atoms which are effectively usable herein include decyl (meth)acrylates, dodecyl (meth)acrylates, tetradecyl (meth)acrylates, and hexadecyl (meth)acrylates, for example. These (meth)acrylates may be used either singly or in the form of a combination of two or more members.

The amount of the (meth)acrylate of a monovalent aliphatic alcohol of 10 to 16 carbon atoms to be used in the monomer (A) is such that the (meth)acrylate accounts for a main moiety, namely not less than 50% by weight, of the monomer (A). If the proportion of the (meth)acrylate to the total amount of the monomer (A) is less than 50% by weight, the produced cross-linked polymer is deficient in oil-absorbing properties, particularly at low temperatures and relative to polar oils and highly viscous oils.

For this invention, therefore, the monomer (A) requires to contain therein not less than 50% by weight of the (meth)acrylate represented by the aforementioned general formula. This monomer (A) may contain therein in a proportion not exceeding 50% by weight a monomer excluding the (meth)acrylate and possessing one polymerizing unsaturated group in the molecular unit thereof.

The monomers which are effectively usable in combination with the (meth)acrylate in the monomer (A) include (meth)acrylates of monovalent aliphatic alcohols of not more than 9 carbon atoms such as methyl (meth)acrylates, ethyl (meth)acrylates, butyl (meth)acrylates, 2-ethylhexyl (meth)acrylates, and n-octyl (meth)acrylates; (meth)acrylates of monovalent aliphatic alcohols of not less than 17 carbon atoms such as octadecyl (meth)acrylates and behenyl (meth)acrylates; (meth)acrylates of alicyclic alcohols such as cyclohexyl (meth)acrylates and methyl (meth)acrylates; (meth)acrylates of phenols such as phenyl (meth)acrylates and octylphenyl (meth)acrylates; aminoalkyl (meth)acrylates such as dimethylaminoethyl (meth)acrylates and diethylaminoethyl (meth)acrylates; (meth)acrylates possessing a polyoxyethylene chain such as polyethylene glycol mono(meth)acrylates and methoxypolyethylene glycol mono(meth)acrylates; (meth)acrylaamides such as (meth)acrylamides, N-methylol (meth)acrylamides, and dimethylaminoethyl (meth)acrylamides; polyolefins such as ethylene and propylene; aromatic vinyl compounds such as styrene, $\alpha$-methyl styrene, and t-butyl styrene; and vinyl chloride, vinyl acetate, acrylonitrile, and (meth)acrylic acids, for example. These monomers may be used either singly or in the form of a combination of two or more members.

The cross-linkable monomer (B) to be used in this invention possesses at least two polymerizable unsaturated groups in the molecular unit thereof and functions as a cross-linking agent.

The cross-linkable monomers (B) which are effectively usable herein include ethylene glycol di(meth)acrylates, diethylene glycol di(meth)acrylates, polyethylene glycol di(meth)acrylates, polyethylene glycol polypropylene glycol di(meth)acrylates, polypropylene glycol di(meth)acrylates, 1,3-butylene glycol di(meth)acrylates, N,N-propylene bisacrylamide, diacrylamide dimethyl ether, N,N-methylene bisacrylamide, glycerol di(meth)acrylates, neopentyl glycerol di(meth)acrylates, 1,6-hexane diol di(meth)acrylates, trimethylol propane tri(meth)acrylates, tetramethylol propane tetra(meth)acrylates, polyfunctional (meth)acrylates obtained by the esterification of alkylene oxide adducts of polyhydric alcohols (such as, for example, glycerin, neopentyl glycol, trimethylol propane, trimethylol ethane, and tetramethylol methane) with (meth)acrylic acids, and divinyl benzene, for example. These cross-linking monomers may be used either singly or in the form of a combination of two or more members.

These oil-absorbent agents are commercially available under a series of trade names "OLEOSORB" (produced by Nippon Shokubai Co., Ltd.), including granular aqueous slurry types, e.g.., "OLEOSORB SL-200", and particularly emulsion types, e.g., "OLEOSORB EM-631".

The amount of the oil-absorbent agent to be used is selected appropriately depending on the oil-absorption properties demanded and usually ranges from 1 to 300 parts by weight, and preferably from 10 to 150 parts by weight on a solid basis, per 100 parts by weight of the rubber component on a solid basis. If it is less than 1 part, the effect on improving oil sealing properties is small. If it exceeds 300 parts, the stress relaxation properties of the composition tends to be deteriorated.

The filler which can be used in the present invention includes inorganic fillers, such as talc, clay, Group II metal sulfates (e.g., barium sulfate), calcium silicate, aluminum oxide, silica, mica, carbon, hydrobiotite, alumina, calcium carbonate, wollastonite, and vermiculite. Compositions using a Group II metal sulfate as a filler are particularly suitable for production of a joint sheet. Specific examples of the Group II metal sulfate are magnesium sulfate, calcium sulfate, barium sulfate, and zinc sulfate. Preferred are calcium sulfate and barium sulfate, with barium sulfate being the most preferred. The finer the Group II metal sulfate particles, the better. Inter alia, particles of 100 mesh or finer, and particularly 250 mesh or finer, are preferred.

The filler is used in an amount usually of from 100 to 2000 parts by weight, and preferably from 200 to 1500 parts by weight, per 100 parts by weight of the rubber component on a solid basis. If the amount of the filler is less than 100 parts, sealing properties of the composition are reduced. If it exceeds 2000 parts, the composition has weak mechanical strength and loses elasticity. Where a Group II metal sulfate is used as a part of the filler, it is used in an amount of from 50 to 500 parts by weight, and preferably from 100 to 300 parts by weight, per 100 parts by weight of the rubber component on a solid basis.

The composition for a sheet containing a perforated metal core plate suitably contains from 5 to 25% by weight, preferably from 7 to 20% by weight, and more preferably from 12 to 18% by weight, of the rubber component on a solid basis from the standpoint of sheet-forming properties, sealing performance, and stress relaxation; and from 1 to 50% by weight, preferably from 10 to 40% by weight, and more preferably from 15 to 30% by weight, of the non-asbestos fibers from the standpoint of strength, dispersibility, and sealing performance. Where an inorganic fiber and an organic fiber are used in combination, the organic fiber is suitably used in an proportion of from 1 to 200 parts by weight, and preferably from 5 to 50 parts by weight, per 100 parts by weight of the inorganic fiber. Use of organic fiber is effective in improvement of sheet-forming properties and sealing performance. The oil-absorbent agent content of the composition for a sheet containing a perforated metal core plate suitably ranges from 1 to 20% by weight, preferably from 2 to 15% by weight, and more preferably from 4 to 10% by weight on a solid basis, from the standpoint of oil sealing properties, and the filler content of that composition suitably ranges from 20 to 80% by weight, preferably from 30 to 70% by weight, and more preferably from 45 to 65% by weight, from the standpoint of sheet-forming properties and sealing properties.

The composition of the present invention can be prepared by mixing one or more of each of the above-described components (a) to (d) appropriately by means of various mixing machines. If desired, additives, such as vulcanizing agents, vulcanization assistants, vulcanization accelerators, antioxidants, pigments, and coupling agents, may be incorporated into the composition upon mixing.

The composition according to the present invention is useful as a gasketing profile, such as a joint sheet, a beater sheet, or a gasketing sheet containing a perforated metal core plate. A joint sheet can be produced by supplying the composition to a calender roll and laminating the composition on the roll surface to obtain sheet of prescribed thickness. A beater sheet can be produced by obtaining a sheet according to a general paper manufacturing technique by means of a Fourdrinier paper machine, a cylinder paper machine, etc., followed by drying and pressing. A gasketing sheet containing therein a perforated metal core plate can be produced by a method comprising laminating the composition on a perforated metal core plate by means of a calender roll, etc. or a method comprising forming the composition into a sheet and then laminating the sheet on a perforated metal core plate.

Figure 2:
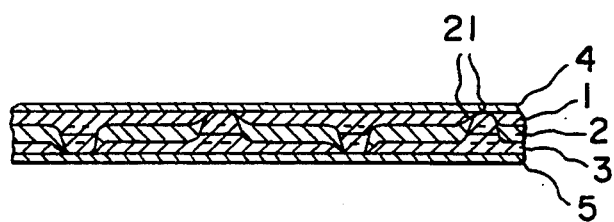
FIG. 2 is a cross section of a gasketing profile for a gasket, having the same structure as in FIG. 1 and further having a cover layer on each seal layer.

The gasketing sheet containing a perforated metal core plate is described below in detail by referring to the accompanying drawings. In FIG. 1, numerals 1 and 3 indicate seal layers, and numeral 2 indicates a metal plate with hooks 21. For the purpose of improving surface smoothness, surface compatibility, and compressibility, the gasketing sheet may have, in addition to the structure of FIG. 1, a cover layer on one or both sides of seal layers 1, 3 as indicated by numerals 4 and 5 in FIG. 2.

The perforated metal core plate to be used is a metal plate having on both sides thereof hooks 21 for anchoring seal layer 1, 3. In general, while not limiting, a perforated metal core plate comprising iron, etc. and having a thickness of from 50 to 500 $\mu$m is employed.

The seal layer is formed by compounding the above-described components (a) to (d).

The seal layer preferably has a density of not less than 1.6 g/cm$^3$, and particularly not less than 1.7 g/cm$^3$, for obtaining satisfactory sealing properties. The thickness of the seal layer is decided appropriately. For preference, it is selected so as to provide a total gasket thickness of not more than 1 mm, and preferably from 0.4 to 0.6 mm.

The cover layer to be provided on the outer side of the seal layer may comprise the same composition of the seal layer or an asbestos-free composition of different kind. The cover layer can be formed in the same manner as for the seal layer. While not limiting, the thickness of the cover layer usually ranges from 5 to 50% of the seal layer.

A suitable composition for the cover layer comprises from 5 to 20% by weight of a rubber component on a solid basis, from 1 to 20% by weight of a non-asbestos fiber, and from 40 to 90% by weight of a filler. The composition may optionally contain an oil-absorbent agent usually in an amount of from 1 to 20% by weight on a solid basis. The non-asbestos fiber to be used in the cover layer preferably includes inorganic fibers having a diameter of from 1 to 20 $\mu$m and an aspect ratio of from 30 to 80 and organic fibers having a diameter of from 3 to 20 $\mu$m and an aspect ratio of from 50 to 100.

The gaskets prepared from the non-asbestos composition of the present invention are advantageously applicable to the places where oil sealing properties are required and, besides, where the gap is narrow, a clamping pressure is small, or a high tensile force is imposed, such as a joint between a converter housing and a transmission case of automobiles.

The present invention is now illustrated in greater detail with reference to Examples, but it should be understood that the present invention is not deemed to be limited thereto. All the parts and percents are given by weight and on a solid basis unless otherwise specified.

EXAMPLE 1

100 Parts of SBR (styrene-butadiene rubber) ("0561" produced by Japan Synthetic Rubber Co., Ltd., hereinafter the same), 150 parts of aromatic polyamide fiber ("Kevlar" produced by Dupont Co., Ltd., hereinafter the same), 20 parts of an oil-absorbent agent ("OLEO-SORB EM-631" produced by Nippon Shokubai Co., Ltd., which has saturation oil absorption to gasoline at room temperature (20° C.) of 12 times the its weight; hereinafter the same), 180 parts of barium sulfate, 550 parts of clay, 550 parts of talc, 5 parts of sulfur (a vulcanizing agent produced by Hosoi Chemical Industry Co., Ltd., hereinafter the same), and 5 parts of tetramethylthiuram disulfide (a vulcanization accelerator produced by Ouchi Shinko Chemical Industrial Co., Ltd., hereinafter the same) were mixed in a mixing machine equipped with a cooling means for about 1 hour to obtain a compound.

EXAMPLE 2

100 Parts of SBR, 150 parts of aromatic polyamide fiber, 20 parts of the oil-absorbent agent, 330 parts of barium sulfate, 550 parts of clay, 400 parts of talc, 5 parts of sulfur, and 5 parts of tetramethylthiuram disulfide were mixed in a mixing machine equipped with a cooling means for about 1 hour to obtain a compound.

EXAMPLE 3

50 Parts of SBR, 50 parts of NBR (acrylonitrile-butadiene rubber) ("LX 513" produced by Nippon Zeon Co., Ltd., hereinafter the same), 150 parts of aromatic polyamide fiber, 40 parts of the oil-absorbent agent, 180 parts of barium sulfate, 550 parts of clay, 550 parts of talc, 5 parts of sulfur, and 5 parts of tetramethylthiuram disulfide were mixed in a mixing machine equipped with a cooling means for about 1 hour to obtain a compound.

EXAMPLE 4

50 Parts of SBR, 50 parts of NBR, 150 parts of phenolic resin fiber ("Kynol" produced by Gunei Chemical Industry Co., Ltd., hereinafter the same), 40 parts of the oil-absorbent agent, 180 parts of barium sulfate, 550 parts of clay, 50 parts of talc, 5 parts of sulfur, and 5 parts of tetramethylthiuram disulfide were mixed in a mixing machine equipped with a cooling means for about 1 hour to obtain a compound.

EXAMPLE 5

50 Parts of SBR, 50 parts of NBR, 50 parts of aromatic polyamide fiber, 100 parts of rock wool ("CMF 150" produced by Nihon Cement Co., Ltd., hereinafter the same), 50 parts of the oil-absorbent agent, 180 parts of barium sulfate, 550 parts of clay, 550 parts of talc, 5 parts of sulfur, and 5 parts of tetramethylthiuram disulfide were mixed in a mixing machine equipped with a cooling means for about 1 hour to obtain a compound.

EXAMPLE 6

50 Parts of SBR, 50 parts of NBR, 50 parts of aromatic polyamide fiber, 100 parts of rock wool, 80 parts of ceramic fiber ("IBI WOOL" produced by Ibiden Co., Ltd.), 50 parts of the oil-absorbent agent, 100 parts of barium sulfate, 550 parts of clay, 550 parts of talc, 5 parts of sulfur, and 5 parts of tetramethylthiuram disulfide were mixed in a mixing machine equipped with a cooling means for about 1 hour to obtain a compound.

EXAMPLE 7

50 Parts of SBR, 50 parts of NBR, 150 parts of aromatic polyamide fiber, 40 parts of the oil-absorbent agent, 180 parts of calcium sulfate, 550 parts of clay, 550 parts of talc, 5 parts of sulfur, and 5 parts of tetramethylthiuram disulfide were mixed in a mixing machine equipped with a cooling means for about 1 hour to obtain a compound.

EXAMPLE 8

100 Parts of NBR, 150 parts of aromatic polyamide fiber, 100 parts of the oil-absorbent agent, 180 parts of calcium sulfate, 550 parts of clay, 550 parts of talc, 5 parts of sulfur, and 5 parts of tetramethylthiuram disulfide were mixed in a mixing machine equipped with a cooling means for about 1 hour to obtain a compound.

EXAMPLE 9

100 Parts of an acrylic rubber ("LX 812" produced by Nippon Zeon Co., Ltd., hereinafter the same), 150 parts of aromatic polyamide fiber, 100 parts of the oil-absorbent agent, 180 parts of barium sulfate, 550 parts of clay, 550 parts of talc, 5 parts of sulfur, and 5 parts of tetramethylthiuram disulfide were mixed in a mixing machine equipped with a cooling means for about 1 hour to obtain a compound.

EXAMPLE 10

100 Parts of NBR, 150 parts of aromatic polyamide fiber, 120 parts of the oil-absorbent agent, 100 parts of barium sulfate, 100 parts of magnesium sulfate, 540 parts of clay, 540 parts of talc, 5 parts of sulfur, and 5 parts of tetramethylthiuram disulfide were mixed in a mixing machine equipped with a cooling means for about 1 hour to obtain a compound.

EXAMPLE 11

100 Parts of natural rubber ("Regitex-V" produced by Nanyo Chemical Co., Ltd., hereinafter the same), 150 parts of aromatic polyamide fiber, 20 parts of an oil-absorbent agent, 180 parts of barium sulfate, 550 parts of clay, 550 parts of talc, 5 parts of sulfur, and 5 parts of tetramethylthiuram disulfide were mixed in a mixing machine equipped with a cooling means for about 1 hour to obtain a compound.

EXAMPLE 12

100 Parts of natural rubber, 150 parts of aromatic polyamide fiber, 20 parts of the oil-absorbent agent, 330 parts of barium sulfate, 550 parts of clay, 400 parts of talc, 5 parts of sulfur, and 5 parts of tetramethylthiuram disulfide were mixed in a mixing machine equipped with a cooling means for about 1 hour to obtain a compound.

COMPARATIVE EXAMPLES 1 TO 12

Compounds were prepared in the same manner as in Examples 1 to 12, except for using no oil-absorbent agent in each case.

Each of the compounds obtained in the foregoing Examples and Comparative Examples was evaluated according to the following test methods. The results obtained are shown in Table 1 below.

Calender Processability

The compound was supplied between a hot calender roll and a cold calender roll and formed into sheet on the hot roll to obtain a 1.5 mm thick joint sheet. Occurrences of defects such as wrinkling due to roll release, blistering, and roughening of surface during the calendering were observed, and processability was rated according to the following standard.

| | |
|---|---|
| Excellent | Satisfactory processability with no occurrence of defects such as wrinkling. |
| Good | The defects were observed on less than 10% of the total sheet area. |
| Medium | The defects were observed on 50% or more of the total-sheet area. |
| Bad | Failure of calendering. |

Stress Relaxation

Measured on the joint sheet prepared above according to JIS R3453 (1985).

Flexibility

Measured on the joint sheet prepared above according to JIS R3453 (1985), and expressed in terms of a bending diameter per sheet thickness at which cracking or wrinkling occurs on bending.

Oil Sealing Properties

JIS No. 3 oil was used for testing. The joint sheet prepared above was cut into a ring of 90 mm in outer diameter and 74 mm in inner diameter. The ring was clamped from both sides under a pressure of 10 kg/cm$^2$. The inner oil pressure was stepwise raised by 0.5 kg/cm$^2$ starting from 0.5 kg/cm$^2$, and the testing system was kept for 15 minutes for every rise in inner oil pressure. The inner oil pressure at which oil leakage was observed with the naked eye was measured.

TABLE 1

| Example No. | Calendering Processability | Stress Relaxation | Flexibility | Oil Sealing Properties (kg/cm$^2$) |
|---|---|---|---|---|
| Example 1 | excellent | 28 | 5 | 14.0 |
| Example 2 | excellent | 25 | 8 | 14.0 |
| Example 3 | excellent | 27 | 5 | 12.0 |
| Example 4 | excellent | 27 | 6 | 12.0 |
| Example 5 | good | 26 | 8 | 12.0 |
| Example 6 | good | 23 | 8 | 12.0 |
| Example 7 | excellent | 25 | 5 | 12.0 |
| Example 8 | excellent | 22 | 5 | 14.0 |
| Example 9 | medium | 23 | 5 | 14.0 |
| Example 10 | excellent | 24 | 6 | 14.5 |
| Example 11 | excellent | 28 | 5 | 14.0 |
| Example 12 | excellent | 25 | 8 | 14.0 |
| Compara. Example 1 | excellent | 28 | 5 | 7.0 |
| Compara. Example 2 | excellent | 25 | 8 | 7.0 |
| Compara. Example 3 | excellent | 26 | 5 | 3.0 |
| Compara. Example 4 | excellent | 27 | 6 | 3.0 |
| Compara. Example 5 | good | 25 | 8 | 2.0 |
| Compara. Example 6 | good | 22 | 8 | 2.0 |
| Compara. Example 7 | excellent | 25 | 5 | 3.0 |
| Compara. Example 8 | excellent | 20 | 5 | 3.0 |
| Compara. Example 9 | medium | 21 | 5 | 3.0 |
| Compara. Example 10 | excellent | 22 | 6 | 3.0 |
| Compara. Example 11 | excellent | 28 | 5 | 7.0 |
| Compara. Example 12 | excellent | 25 | 8 | 7.0 |

It can be seen from the results in Table 1 that incorporation of an oil-absorbent agent in the compound brings about a significant improvement in oil sealing properties without causing deterioration in calendering processability, stress relaxation properties, and flexibility.

EXAMPLE 13

100 Parts of an SBR latex, 50 parts of cellulose fiber, 200 parts of aromatic polyamide fiber, 20 parts of the oil-absorbent agent, 500 parts of clay, and 500 parts of talc were poured into a proper amount of water, followed by thoroughly mixing to prepare an aqueous slurry. A beater sheet was prepared from the slurry by means of a Fourdrinier paper machine in a usual manner to obtain a 1.5 mm thick beater sheet.

EXAMPLE 14

A 1.5 mm thick beater sheet was obtained in the same manner as in Example 13, except for using 50 parts of SBR latex, 50 parts of NBR latex, 50 parts of cellulose fiber, 200 parts of aromatic polyamide fiber, 40 parts of the oil-absorbent agent, 500 parts of clay, and 500 parts of talc.

EXAMPLE 15

A 1.5 mm thick beater sheet was obtained in the same manner as in Example 13, except for using 50 parts of SBR latex, 50 parts of NBR latex, 50 parts of cellulose fiber, 200 parts of phenolic resin fiber, 40 parts of the oil-absorbent agent, 500 parts of clay, and 500 parts of talc.

EXAMPLE 16

A 1.5 mm thick beater sheet was obtained in the same manner as in Example 13, except for using 50 parts of SBR latex, 50 parts of NBR latex, 50 parts of cellulose fiber, 100 parts of aromatic polyamide fiber, 100 parts of rock wool, 50 parts of the oil-absorbent agent, 500 parts of clay, and 500 parts of talc.

EXAMPLE 17

A 1.5 mm thick beater sheet was obtained in the same manner as in Example 13, except for using 100 parts of NBR latex, 50 parts of cellulose fiber, 200 parts of aromatic polyamide fiber, 100 parts of the oil-absorbent agent, 500 parts of clay, and 500 parts of talc.

EXAMPLE 18

A 1.5 mm thick beater sheet was obtained in the same manner as in Example 13, except for using 100 parts of acrylic rubber latex, 50 parts of cellulose fiber, 200 parts of aromatic polyamide fiber, 100 parts of the oil-absorbent agent, 500 parts of clay, and 500 parts of talc.

EXAMPLE 19

A 1.5 mm thick beater sheet was obtained in the same manner as in Example 13, except for using 100 Parts of natural rubber latex, 50 parts of cellulose fiber, 200 parts of aromatic polyamide fiber, 20 parts of the oil-absorbent agent, 500 parts of clay, and 500 parts of talc.

EXAMPLE 20

A 1.5 mm thick beater sheet was obtained in the same manner as in Example 13, except for using 50 parts of natural rubber latex, 50 parts of NBR latex, 50 parts of cellulose fiber, 200 parts of aromatic polyamide fiber, 40 parts of the oil-absorbent agent, 500 parts of clay, and 500 parts of talc.

COMPARATIVE EXAMPLES 13 TO 20

Beater sheets (1.5 mm thick) were obtained in the same manner as in Examples 13 to 20, except for using no oil-absorbent agent in each case.

Each of the beater sheets obtained in Examples 13 to 20 and Comparative Examples 13 to 20 was tested in the same manner as in Example 1, and the results obtained are shown in Table 2 below.

TABLE 2

| Example No. | Stress Relaxation | Flexibility | Oil Sealing Properties (kg/cm$^2$) |
|---|---|---|---|
| Example 13 | 30 | 5 | 12.0 |
| Example 14 | 30 | 5 | 12.0 |
| Example 15 | 30 | 6 | 11.0 |
| Example 16 | 29 | 8 | 11.0 |
| Example 17 | 28 | 5 | 12.0 |
| Example 18 | 28 | 5 | 12.0 |
| Example 19 | 30 | 5 | 12.0 |
| Example 20 | 30 | 5 | 12.0 |
| Compara. Example 13 | 30 | 5 | 5.0 |
| Compara. Example 14 | 29 | 5 | 3.0 |
| Compara. Example 15 | 29 | 6 | 3.0 |
| Compara. Example 16 | 28 | 8 | 2.0 |
| Compara. Example 17 | 26 | 5 | 3.0 |
| Compara. Example 18 | 26 | 5 | 3.0 |
| Compara. Example 19 | 30 | 5 | 5.0 |
| Compara. Example 20 | 29 | 5 | 3.0 |

EXAMPLE 21

6 Percents of NBR, 7% of SBR, 7% of aromatic polyamide fiber ("Twaron" produced by Enka Corp., hereinafter the same), 23% of rock wool, 5% of the oil-absorbent agent, and fillers comprising talc, clay, and silica (hereinafter the same) in a total amount of 47%, and a vulcanizing agent, sulfur and a pigment, iron oxide (produced by Toda Industry Co., Ltd.) in a total amount of 5% were mixed in a mixing machine equipped with a cooling means for about 1 hour to obtain a compound.

The resulting compound was laminated on both sides of a both side-perforated iron core plate having a thickness of 0.2 mm by means of calender rolls and then vulcanized by heating to obtain a 0.5 mm thick gasket.

COMPARATIVE EXAMPLE 21

A gasket was obtained in the same manner as in Example 21, except for using a compound comprising 7% of NBR, 8% of SBR, 7% of aromatic polyamide fiber, 23% of rock wool, 50% of fillers, and 5% of (a vulcanizing agent + a pigment).

COMPARATIVE EXAMPLE 22

A 0.5 mm thick gasketing sheet was obtained in the same manner as in Example 1, without using perforated iron core plate.

Each of the gaskets obtained in Example 21 and Comparative Examples 21 to 22 was evaluated for oil sealing properties in the same manner as in Example 1 and for tensile strength according to JIS R3453. Further, practical performance of the gasket was tested as follows.

Practical Test

The gasket was set at the joint between a converter housing and a transmission case of an automobile. A shear force was repeatedly applied to the gasket while maintaining the oil temperature at 120° C., and the number of times of shear application at breakage was taken as an indication of practical performance.

The results of these tests are shown in Table 3 below.

TABLE 3

| Example No. | Tensile Strength (kg/cm$^2$) | Oil Sealing Properties (kg/cm$^2$) | Practical Performance (number of times) |
|---|---|---|---|
| Example 21 | 680 | 13.0 | >10000 |
| Compara. Example 21 | 680 | 6.0 | >10000 |
| Compara. Example 22 | 140 | 13.5 | 2500 |

While the invention has been described in detail and with reference to specific examples thereof, it will be apparent to one skilled in the art that various changes and modifications can be made therein without departing from the spirit and scope thereof.

What is claimed is:

1. A gasketing composition comprising (a) 100 parts by weight of a styrene-butadiene rubber, (b) 50–500 parts by weight of an aromatic polyamide fiber, (c) 1–300 parts by weight of an oil absorbent agent which is a self-swelling acrylic polymer having a crosslinked structure, and (d) 100–2000 parts by weight of a filler comprising a Group II metal sulfate, talc and clay.

2. A gasketing composition as claimed in claim 1, wherein said rubber is in a form of a latex.

3. A gasket made from a composition comprising (a) 100 parts by weight of a styrene-butadiene rubber, (b) 50–500 parts by weight of an aromatic polyamide fiber, (c) 1–300 parts by weight of an oil absorbent agent which is a self-swelling acrylic polymer having a crosslinked structure, and (d) 100–2000 parts by weight of a filler comprising a Group II metal sulfate, talc and clay.

4. A gasket comprising a beater sheet made from a composition comprising (a) 100 parts by weight of a styrene-butadiene rubber, (b) 50–500 parts by weight of an aromatic polyamide fiber, (c) 1–300 parts by weight of an oil absorbent agent which is a self-swelling acrylic polymer having a crosslinked structure, and (d) 100–2000 parts by weight of a filler comprising a Group II metal sulfate, talc and clay.

5. A gasket comprising a joint sheet made from a composition comprising (a) 100 parts by weight of a styrene-butadiene rubber, (b) 50–500 parts by weight of an aromatic polyamide fiber, (c) 1–300 parts by weight of an oil absorbent agent which is a self-swelling acrylic polymer having a crosslinked structure, and (d) 100–2000 parts by weight of a filler comprising a Group II metal sulfate, talc and clay.

6. A gasket as claimed in claim 3, wherein said gasket comprises a perforated metal core plate having provided on one or both sides thereof a layer made of said composition.

* * * * *